United States Patent
Yuya (10) Patent No.: US 6,598,588 B2
(45) Date of Patent: Jul. 29, 2003

(54) CONTROLLING OF IGNITION TIMING OF AN INTERNAL COMBUSTION ENGINE

(75) Inventor: Masahiko Yuya, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/943,066

(22) Filed: Aug. 31, 2001

(65) Prior Publication Data

US 2002/0026925 A1 Mar. 7, 2002

(30) Foreign Application Priority Data

Sep. 1, 2000 (JP) ..................................... 2000-265868

(51) Int. Cl.$^7$ .................................................. F02P 5/15
(52) U.S. Cl. ........................... 123/406.54; 123/406.55; 123/179.5
(58) Field of Search ..................... 123/179.5, 406.54, 123/406.55

(56) References Cited

U.S. PATENT DOCUMENTS 4,416,234 A * 11/1983 Ikeura .................... 123/406.55

FOREIGN PATENT DOCUMENTS

| JP | 6-137246 | 5/1994 |
|----|----------|--------|
| JP | 8-86236  | 4/1996 |
| JP | 2000-9006 | 1/2000 |

\* cited by examiner

Primary Examiner—Erick Solis
(74) Attorney, Agent, or Firm—Foley & Lardner (57) ABSTRACT

An ignition-timing controlling apparatus for an internal combustion controls a basic ignition timing during cranking of the engine so as to correctively shift the basic ignition timing toward a retard angle side when the number of times of ignitions occurring in the combustion chamber of the engine are detected to have reached a predetermined number of times after the start of cranking operation. The amount of corrective shifting of the basic ignition timing toward the retard angle side is set by the ignition-timing controlling apparatus, on the basis of a temperature rise in the combustion chamber that is estimated by the detection of the number of times of ignitions. The ignition practically conducted by the internal combustion engine during cranking of the engine is controlled so as to meet with the correctively shifted ignition timing to thereby prevent both a reduction in the developed torque due to an excessive advance of the basic ignition timing, and generation of reverse torque, and to enhance the cranking performance of the internal combustion engine.

34 Claims, 9 Drawing Sheets

CONTROLLING OF IGNITION TIMING OF AN INTERNAL COMBUSTION ENGINE

BACKGROUND OF THE INVENTION

1. Field of the Invention

The present invention relates generally to a controlling technique of an ignition timing of an internal combustion engine, and more particularly, it relates to an apparatus for and method of controlling the ignition timing during cranking of the internal combustion engine.

2. Background Information

Japanese Laid-Open Patent Publication No. 6-137246 discloses a method of controlling the ignition timing of an internal combustion engine, in which the ignition timing during the cranking operation of the engine is constantly controlled on the basis of an ignition timing set to have a fixed advance angle. Then, when the engine rotating speed reaches a desired rotating speed, e.g., 500 r.p.m, the setting of the ignition timing at the fixed advance angle is terminated to commence the controlling of the ignition timing by a feedback control method. Nevertheless, in the proposed method, controlling of ignition timing of the engine is conducted by a non-feedback control method on the basis of the ignition timing of the fixed advance angle until the engine reaches the above-mentioned desired rotating speed, irrespective of a temperature rise in the combustion chamber of the engine. As a result, there is some doubt if the ignition timing during the cranking of the engine could be somewhat sifted from the optimum timing.

Also, Japanese Laid-Open Patent Publication No. 8-86236 discloses a method of controlling the ignition timing of an internal combustion engine, in which a state of combustion of fuel-air charge in the combustion chambers is monitored during cranking of the engine to detect whether or not explosion consecutively occurs in the engine after the initial explosion, and if it is detected that the consecutive explosion does not occur in the engine, the ignition timing of the engine is advanced. Further, when the detection of non-consecutive explosion lasts, temperature in the combustion chamber or chambers in which combustion takes place increases while reducing delay in firing of the air-fuel charge, and accordingly, such a condition is produced in which a requested timing of ignition is shifted toward the retard angle side. As a result, under this condition, if the ignition timing is advanced, the excessively early firing of the air-fuel charge in the combustion chamber or chambers might occur so that the engine is permitted to generate a reverse torque.

A further technical contrivance for controlling an ignition timing of an internal combustion engine is disclosed in Japanese laid-Open Patent Publication No. 2000-9006. In this technical contrivance, controlling of the ignition timing is transferred from an initial controlling mode at the time of cranking in which the ignition timing is controlled to be fixedly set at a retard angle side to an ordinary controlling mode after the cranking, and the ignition timing is gradually advanced to a desired timing of ignition during the ordinary controlling mode. Nevertheless, it should be understood that controlling of the ignition timing at the time of cranking is not changed from a conventional controlling art in which the timing of ignition is intentionally set at a retard angle side.

The above three disclosures reveal that the controlling of ignition timing during cranking of an internal combustion engine according to the prior art is based on a method in which the ignition timing is fixedly set at a generally retard angle side with respect to the engine dead center. Even when correction is made to shift the ignition timing toward an advance angle side, there is some doubt if an excessively early firing might occur in the combustion chambers of the internal combustion engine. Consequently, it is understood that an optimum controlling of ignition timing could not be successfully achieved by the prior art.

SUMMARY OF THE INVENTION

The present invention was made while taking into consideration the above-described prior art.

Therefore, an object of the present invention is to provide a method of realizing an optimum controlling of the ignition timing during cranking of an internal combustion engine while suppressing an occurrence of an excessively early ignition.

In accordance with one aspect of the present invention, there is provided an apparatus for controlling an ignition timing of an internal combustion engine, which comprises:

a starter for cranking the engine;

a microprocessor programmed to:
  detect a cranking operation of said engine, and
  set an ignition timing employed in the cranking operation in accordance with a parameter that represents a temperature in a combustion chamber of said engine; and a spark plug that ignites an air-fuel mixture in the combustion chamber on the basis of the ignition timing when said engine is in the cranking operation.

In accordance with another aspect of the present invention, there is provided an apparatus for controlling an ignition timing of an internal combustion engine, which comprises:

a starter switch;

a starter, connected to said starter switch, for cranking the engine;

means for detecting a cranking operation of said engine;

means for setting an ignition timing employed in the cranking operation based on a parameter that represents a temperature in a combustion chamber of the engine; and a spark plug for igniting an air-fuel mixture in the combustion chamber on the basis of the ignition timing when the engine is in the cranking operation.

In accordance with a further aspect of the present invention, there is provided a method of controlling an ignition timing of an internal combustion engine, which comprises:

detecting a cranking operation of said engine;

setting an ignition timing employed in the cranking operation based on a parameter that represents a temperature in a combustion chamber of said engine; and igniting an air-fuel mixture in the combustion chamber on the basis of said ignition timing when said engine is in the cranking operation.

Namely, according to the present invention, a change in the temperature in the combustion chamber after the start of cranking operation is estimated to detect a rise in the temperature of the combustion chamber, and since a correction is applied to the ignition timing during cranking of the internal combustion engine in response to the detected temperature rise in the combustion chamber, there is no anxiety about any possibility of occurrence of excessive advance of the ignition timing during ordinary cranking operation of the internal combustion engine. Accordingly, the ignition timing can be set at an optimum timing of ignition e.g., at an ignition timing of so-called minimum advance for best torque (MBT), and therefore cranking performance of an internal combustion engine can be greatly enhanced.

The above and other objects, aspects, features and advantages of the present invention will become more apparent from the ensuing description of preferred embodiments thereof in conjunction with the accompanying drawings.

BRIEF DESCRIPTION OF THE DRAWINGS

Referring now to the accompanying drawings which form a part of the present disclosure.

DETAILED DESCRIPTION OF THE PREFERRED EMBODIMENTS

Figure 1:
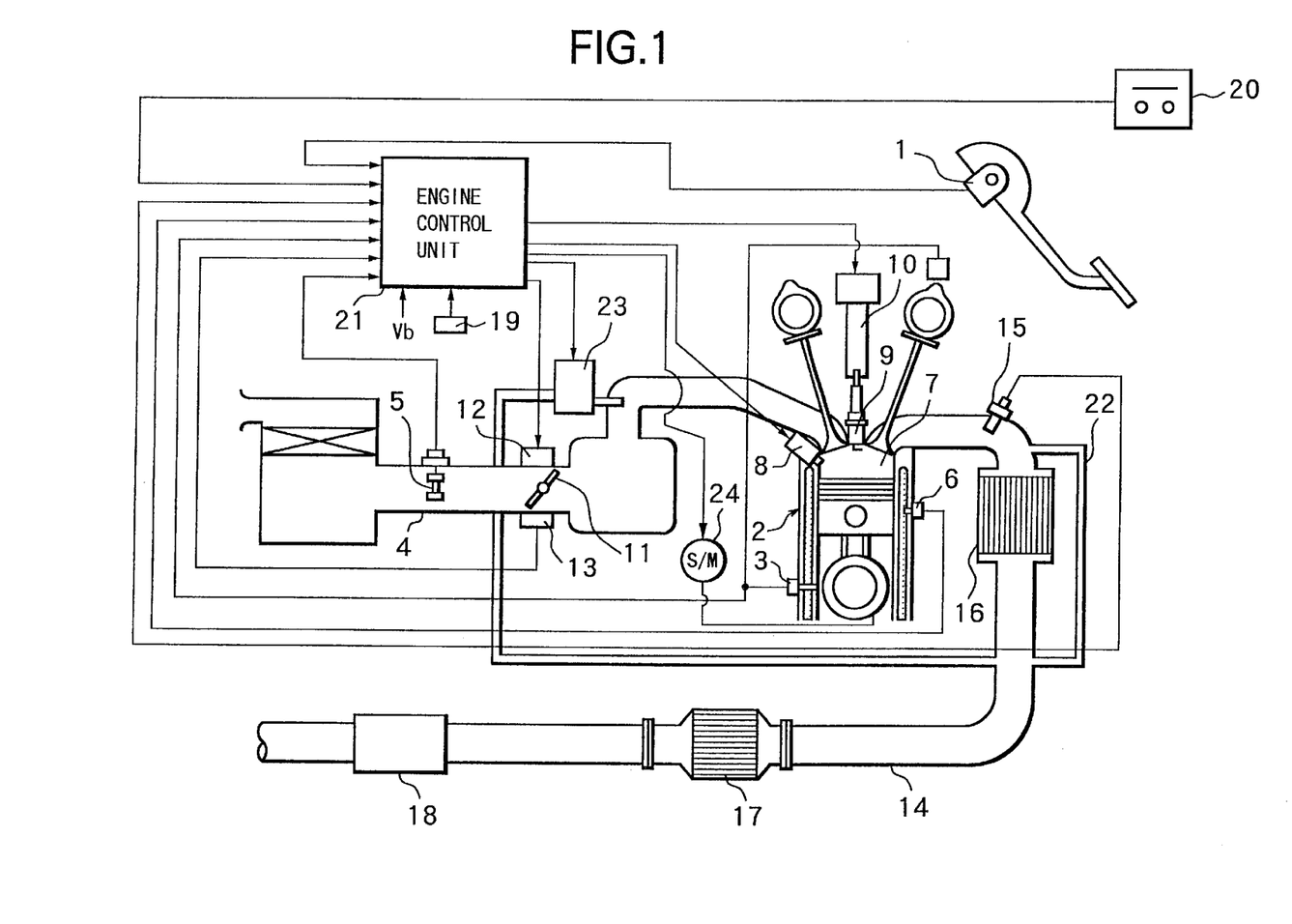
FIG. 1 is a diagrammatic block diagram illustrating an entire system of an internal combustion engine, which includes a control apparatus for controlling an ignition timing of the internal combustion engine, according to first through third embodiments of the present invention.

Referring to FIG. 1, which illustrates the entire system of an internal combustion engine including a control apparatus for controlling an ignition timing of the engine according to the first through third embodiments of the present invention, the system has an accelerator pedal provided with a sensor for detecting an opening degree of an engine accelerator, via detection of an amount of depression of the accelerator pedal by an engine operator (a car driver). An internal combustion engine 2 (only one cylinder is typically shown) is provided with a crank angle sensor 3, which generates either a position signal generated at every unit crank angle or a reference signal generated at every phase difference among the cylinder strokes. The crank angle sensor 3 is capable of detecting the rotational speed Ne of the engine 2 by measuring either the number of generation of the above-mentioned position signals per unit time or the cycle of generation of the above-mentioned reference signals. The internal combustion engine 2 is also provided with an intake passage 4 at a part of which is arranged an airflow meter 5 detecting an amount of intake air per a unit time flowing into the engine 2. The internal combustion engine 2 is also provided with a cylinder block to which is attached a water-temperature sensor 6 detecting temperature of the cooling water flowing around the engine 2.

A cylinder portion of the internal combustion engine 2 is provided with fuel-injection valves 8 each of which is arranged for directly injecting a fuel into each of combustion chambers 7, and spark plugs 9 each of which is arranged for conducting spark ignition in each of the combustion chambers 7, so as to ignite an air-fuel mixture in each combustion chamber. Each of the spark plugs 9 is connected to a corresponding one of ignition coils 10 which are arranged to be electrically driven through ON-OFF operation of a power transistor.

The above-mentioned intake passage 4 is also provided therein with a throttle valve 11 an opening degree of which is electronically controlled by a throttle valve controller 12 disposed at a position adjacent to the throttle valve 11. An amount of opening degree of the throttle valve 11 is detected by a throttle sensor 13, which is also disposed at a position adjacent to the throttle valve 11.

The internal combustion engine 2 is further provided with an exhaust passage 14 in which are arranged an air-fuel ration sensor 15 for detecting air-fuel ration of the air-fuel mixture on the basis of detection of a specified component within the exhaust gas such as oxygen gas component, an upstream side exhaust scrubbing catalyst 16, a downstream side exhaust scrubbing catalyst 17, and a muffler 18.

The system of the internal combustion engine 2 is provided with an engine control unit 21 to which signals are supplied from the above-described diverse sensors, an ignition switch 19, and a starter switch 20. Also, a signal Vb indicating a voltage level of an engine battery is supplied to the engine control unit 21. The engine control unit 21 is usually formed by a known microprocessor in which various controlling operations can be programmed. Thus, the engine control unit 21 conducts various controlling operations on the basis of an engine operating condition detected through the supplied signals. Namely, the engine control unit 21 controls the opening degree of the throttle valve 11 via the throttle valve controller 12. The engine control unit 21 drives the fuel injection valves 8 to control and adjust an amount of fuel injection. The engine control unit 21 further conducts setting of ignition timing to control the spark ignition of the spark plugs 9 on the basis of the set ignition timing.

The internal combustion engine 2 is further provided with an EGR apparatus including an EGR passage (Exhaust Gas Recirculation passage) 22, which is arranged for circulating a part of the exhaust gas from the exhaust passage 14 to the intake passage 4 and an EGR valve 23 interposed in the EGR passage 22.

The engine 2 is cranked by a starter motor 24, which is arranged to be electrically driven via the engine control unit 21, in response to the cranking operation of the starter switch 20. Namely, the drive power is supplied to the starter motor 24 by a battery (not shown in FIG. 1).

The description of controlling of the ignition timing during cranking of an internal combustion engine according to the present invention will be provided hereinbelow.

Figure 9A:
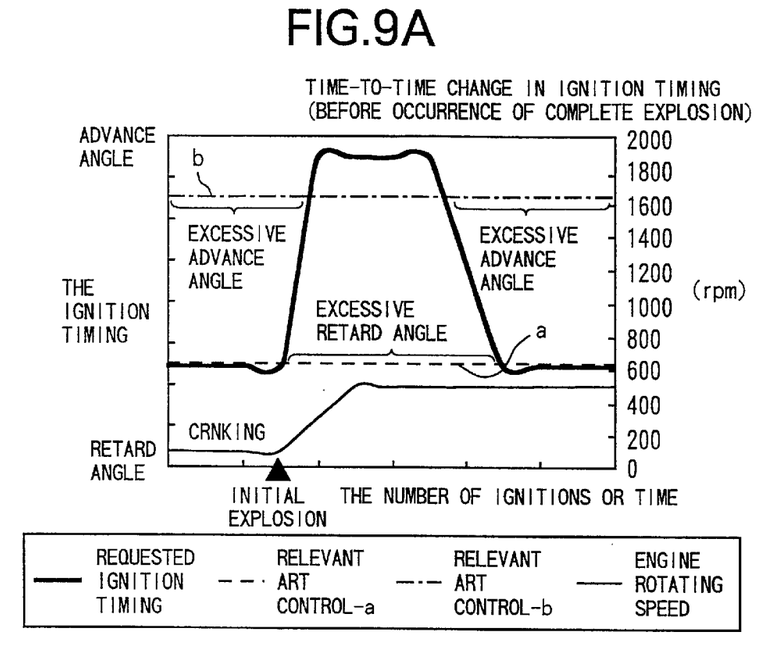
Figure 9B:
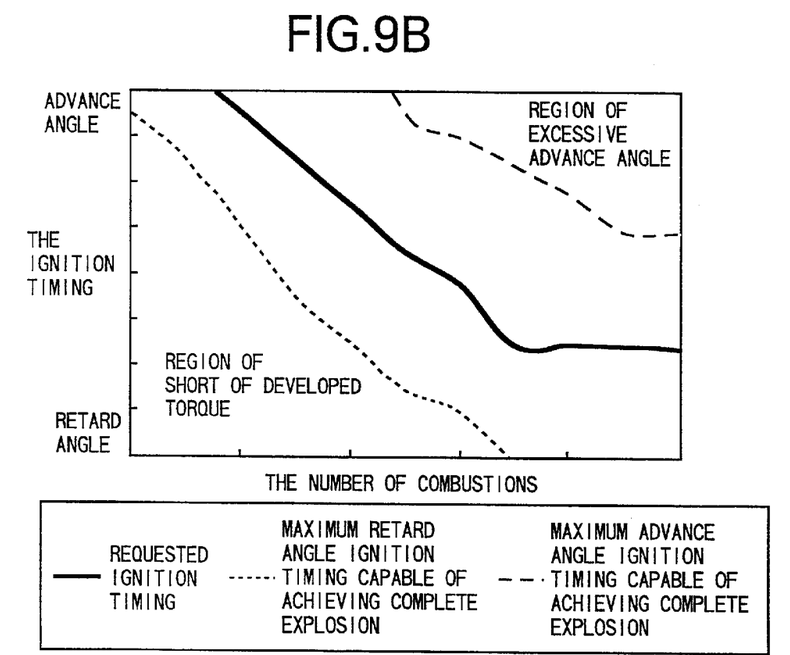

FIGS. 9A and 9B illustrates the characteristic of the ignition timing requested during cranking of an internal combustion engine with reference to the time lapse.

The ignition timing requested during ordinary cranking of an internal combustion timing, i.e., during cranking of a cold internal combustion engine, exhibits a characteristic curve as shown in FIG. 9A.

As shown in FIG. 9A, during the time interval from a time of cranking operation to turn the starter switch 20 "ON" to another time of an initial explosion in which combustion is started, the internal combustion engine is rotated at an extreme small rotating speed, and the crank angle of the engine corresponding to an ignition delay is very small. Thus, the requested ignition timing stays in a greatly retarded timing region. After the initial explosion, the engine speed increases while increasing the crank angle of the engine corresponding to the ignition delay. Therefore, the requested ignition timing is shifted to an advanced timing region. In order to obtain a maximum developed torque during cranking of the engine so as to enhance the cranking performance, the ignition timing of the internal combustion engine should be controlled so as to meet with the above-mentioned requested ignition timing during cranking of the internal combustion engine.

However, if the cranking operation spends much time, the temperature developing in the combustion chamber or chambers of the engine 2 increases due to the combustion so as to decrease the ignition delay, and accordingly the requested ignition timing is shifted to a retarded timing region (refer to FIG. 9B) Therefore, if the ignition timing is controlled so as to meet with the requested ignition timing before being shifted, without taking into consideration the above-mentioned temperature increase in the combustion chambers, the ignition occurs at an ignition timing advanced from the actually requested ignition timing while causing an excessively early firing.

As described hereinbefore, in a related art, the ignition timing during cranking of an internal combustion engine is set a fixed timing. In order to avoid occurrence of the ignition at the above-mentioned timing advanced from the actually requested timing, if the ignition timing is set at a timing belonging to a retarded timing so as to meet with the requested ignition timing before increasing of the engine speed as shown by a curve "a" in FIG. 9A, the requested ignition timing is shifted to an advanced timing region when the engine speed fully increases. Accordingly, there appears a difference between the fixedly set ignition timing and the requested ignition timing, and therefore the developed torque of the internal combustion engine 2 is reduced to thereby degrade the cranking performance of the internal combustion engine.

On the other hand, if an ignition timing is fixedly set at an advanced timing as indicated by the curve "b" in FIG. 9A so as to meet with the requested ignition timing after increasing of the engine rotating speed, which is an advanced ignition timing, it is true that a developed torque in the region where the rotating speed is increased can be large. Nevertheless, the requested ignition timing during an initial stage of cranking before the initial explosion and that at a time when a rise in the temperature in the combustion chamber or chambers occurs due to lasting of cranking operation for a long time must become excessively advanced. Therefore, the developed torque is in turn reduced while giving an adverse affect on the physical durability of an internal combustion engine.

Taking into consideration the described technical problems, the present invention was made to control the ignition timing during cranking of an internal combustion engine so as to meet with practically requested ignition timing.

The description of controlling of ignition timing according to the first embodiment of the present invention will be provided hereinbelow with reference to the flow chart shown in FIG. 2 in connection with the engine system of FIG. 1.

The operation for controlling the ignition timing of an internal combustion engine is conducted by the engine control unit 21 (see FIG. 1), i.e., the above-described microprocessor.

Figure 2:
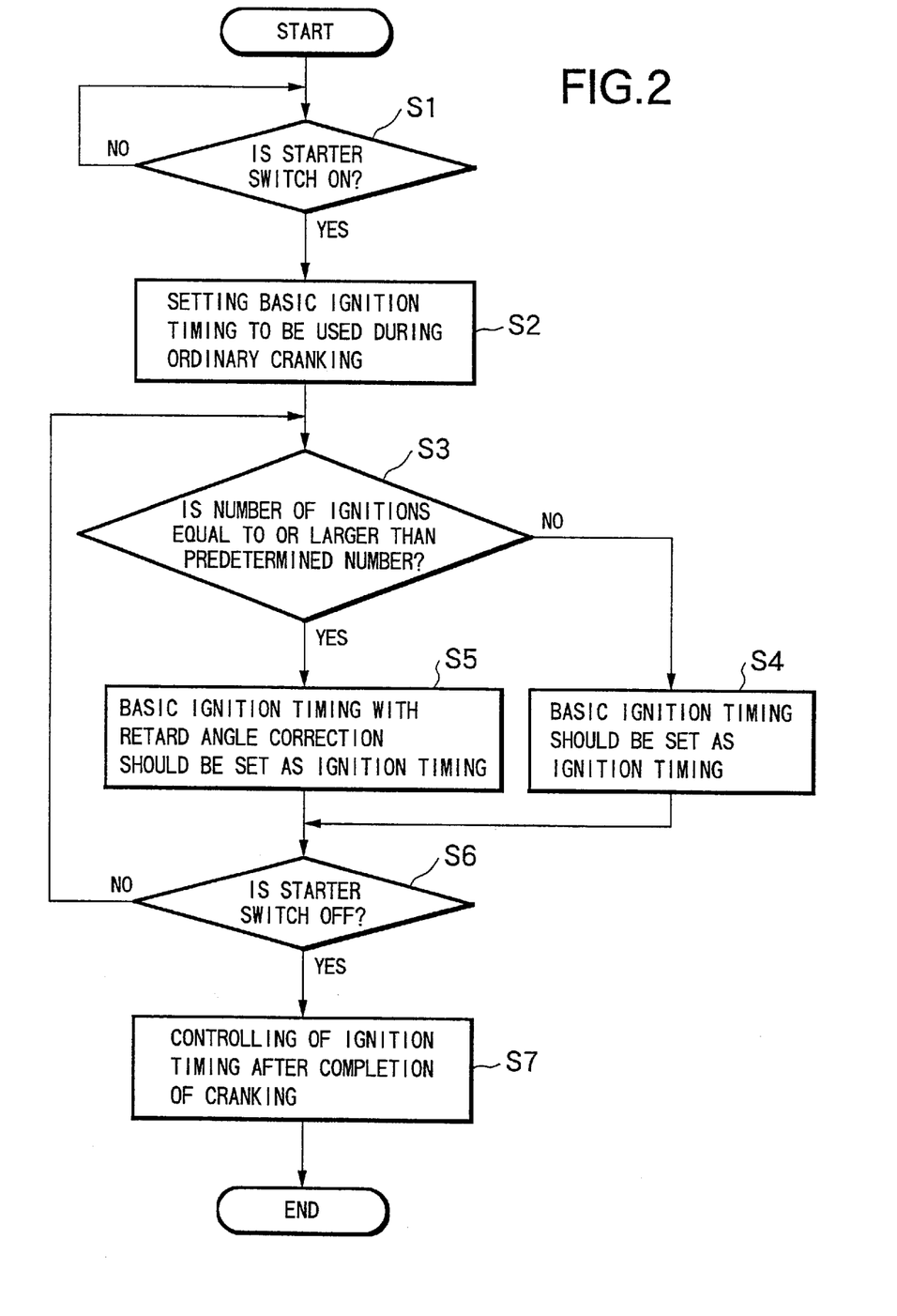
FIG. 2 is a flow chart illustrating the routine of controlling conducted by a control apparatus for controlling ignition timing of an internal combustion engine according to the first embodiment of the present invention.

Referring to the flow chart of FIG. 2, a judgment as to whether or not the started switch 20 is turned on is conducted in Step 1. When it is judged that the starter switch 20 is turned on, i.e., when the microprocessor detects that cranking operation of the internal combustion engine 2 has been performed (YES), the controlling routine is forwarded to Step 2 to set a basic ignition timing as stated below by the microprocessor.

Namely, as the engine rotating speed is very slow until an initial explosion occurs in the engine 2, the basic ignition timing is set at a greatly retarded timing. After the initial explosion, correction is made so that the basic ignition timing is set at a timing shifted and advanced in such a manner that an amount of advance is increased in response to an increase in the engine rotating speed.

In step 3, a judgment is conducted by the microprocessor as to whether or not the number of ignitions after the cranking operation is equal to or lager than a predetermined number. When it is judged that the ignition number is less than the predetermined number (NO), the controlling routine is forwarded to Step 4 to finally set the ignition timing at the above-mentioned basic ignition timing set in Step 2, and the actual timing of ignition conducted by the spark plug 9 is controlled so as to meet with the set basic ignition timing.

On the contrary, when it is judged in Step 3 that the ignition number is equal to or larger than the predetermined number (YES), the controlling routine is forwarded to Step 5 to finally set the ignition timing at the above-mentioned basic ignition timing set in Step 2 after providing a predetermined amount of retard angle correction to the basic ignition timing, and the actual timing of ignition conducted by the spark plug 9 is controlled so as to meet with the finally set corrected ignition timing.

In Step 6, a judgment as to whether or not the starter switch 20 is turned off, i.e., whether or not the cranking of the internal combustion engine 2 is terminated, is conducted. When it is judged that the starter switch 20 has not yet been turned off to still continue the cranking operation, the controlling routine is returned to Step 3. When it is judged that the starter switch 20 has already been tuned off to terminate the cranking operation, the afore-mentioned controlling of ignition timing during cranking of the internal combustion engine is completed, and the controlling routine is forwarded to Step 7 to conduct an ordinary controlling of ignition timing on the basis of the engine rotating speed after the cranking and a load applied to the engine 2.

Figure 3:
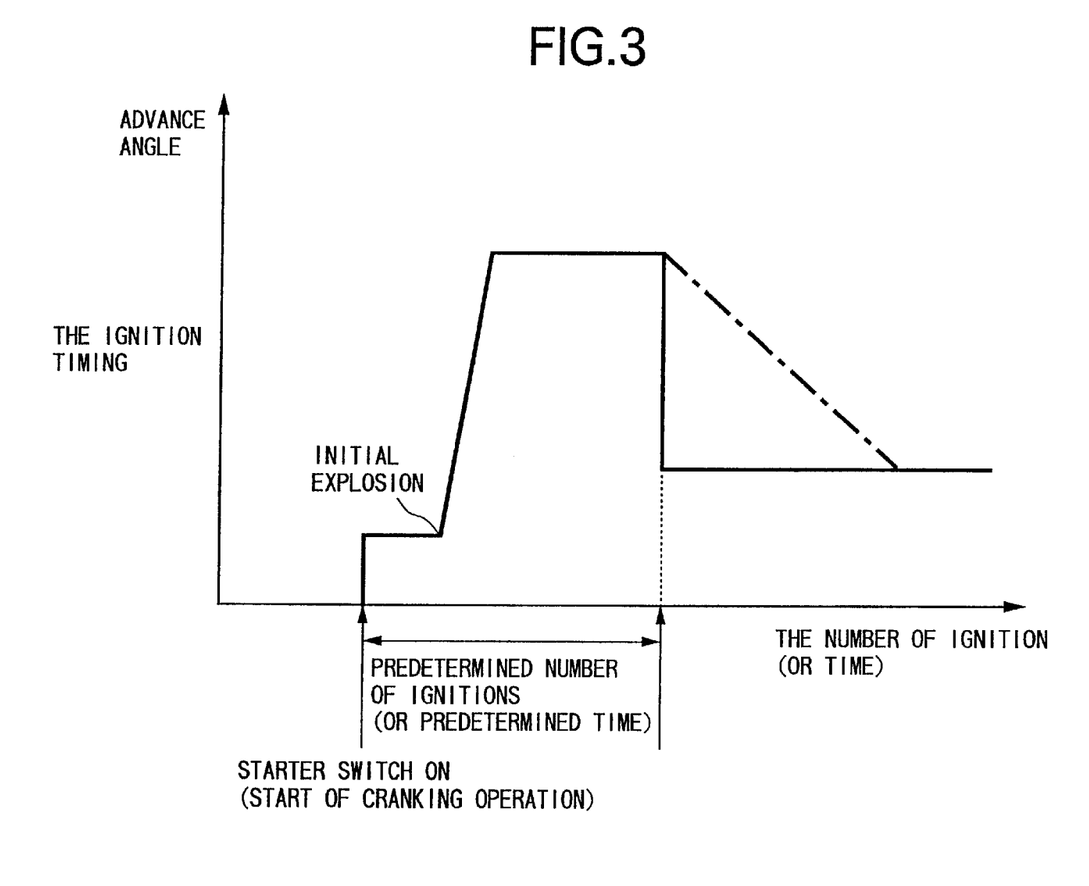
FIG. 3 is a graphical view illustrating the characteristic of ignition timing during cranking with reference to the time lapse or the number of ignitions, represented by the control apparatus of the first embodiment of the present invention.

When the above-described controlling of ignition timing during cranking of the internal combustion engine is conducted, the ignition timing is sufficiently retarded until the initial explosion occurs after the cranking operation as shown in the graph of FIG. 3. After the initial explosion, the ignition timing is adjustably shifted toward the advance angle region in response to an increase in the engine rotating speed, and the actual timing of ignition is controlled so as to meet with the requested ignition timing. Namely, an optimum controlling of ignition timing of an internal combustion engine can be constantly conducted without considering any possibility that the ignition timing might be excessively advanced, and accordingly a large developed torque can be obtained to thereby ensure a good cranking performance of an internal combustion engine.

Further, when the cranking of an internal combustion engine takes as a long time due to any abnormal operation of an operator (a car driver) as the number of ignition is equal to or larger than the predetermined numbers, the afore-mentioned retard angle correction is made to the ignition timing (refer to the indication by solid line in FIG. 3). Therefore, controlling of the ignition timing can be conducted so as to meet with the requested ignition timing, which is shifted toward the retard angle region in response to an increase in the temperature of the combustion chamber or chambers that occurs due to an increase in the number of combustion. Accordingly, a reduction in the developed torque due to excessively advanced ignition timing can be surely prevented so that any adverse affect on the physical durability of the internal combustion engine due to generation of a reverse torque may be avoided.

At this stage, after the afore-mentioned number of ignition becomes larger than the predetermined numbers, the ignition timing may be corrected so that an amount of the retard angle correction made to the ignition timing increases in response to an increase in the ignition numbers. Then, a change in the ignition timing can be gentle resulting in suppressing a change in the developed torque as indicated by dot-and-dash line in FIG. 3. In the above-described first embodiment, it will be understood that the microprocessor sets the ignition timing in the cranking operation in accordance with a parameter representing a temperature in the combustion chamber of the engine 2, and the parameter per se is detected through the detection of the ignition number in the combustion engine.

Now, the description of a controlling of ignition timing during cranking of an internal combustion engine according to a second embodiment of the present invention will be provided hereinbelow.

The second embodiment of the present invention is different from the foregoing first embodiment of the present invention in that an increase in the temperature prevailing in the combustion chamber or chambers of the internal combustion engine is estimated on the basis of the time lapse from the initiation of the cranking operation of the engine instead of estimating the temperature rise in the combustion chamber or chambers on the basis of the number of ignition after cranking of the engine in the first embodiment. Namely, in the second embodiment, the above-mentioned parameter is detected through the detection of the time lapse from the initiation of the cranking operation of the engine 2.

Figure 4:
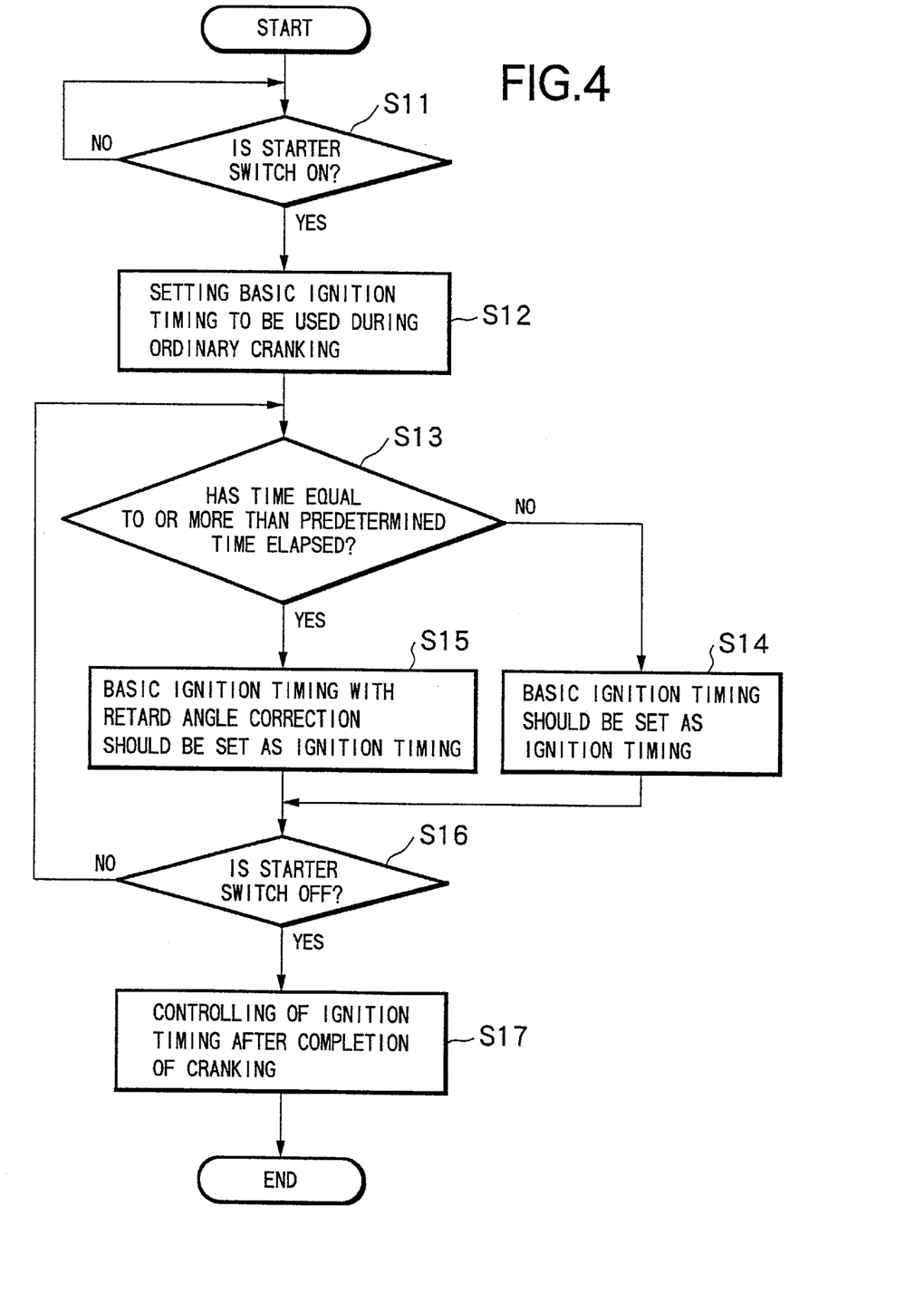
FIG. 4 is a flow chart illustrating the routine of controlling conducted by a control apparatus for controlling ignition timing of an internal combustion engine according to the second embodiment of the present invention.

The flow chart of FIG. 4 illustrates the controlling steps of the ignition timing during cranking of an internal combustion engine according to the second embodiment.

It should be noted that the controlling steps (Steps 11 through 17) of the flow chart in the FIG. 4 is different from those (Steps 1 through 7) of the flow chart in FIG. 2 only in that the time lapse from the initiation of the cranking operation of the engine 2 is judged in Step 13 as to whether or not it is equal to or larger than a predetermined time.

Although the time lapse from the initiation of the cranking operation is approximately proportional to the number of ignition after the cranking operation, a measurement of such time lapse can be effective for precisely and simply estimating a change in the temperature rise in the combustion chamber or chambers of the engine. Therefore, correction control of the ignition timing during cranking of the engine can be accurately achieved.

It should be understood that in the second embodiment, an amount of retard angle correction made to the basic ignition timing after the time lapse has reached the predetermined time may be increased in response to an increase in the time lapse. Then, similar to the first embodiment, a change in the ignition timing can be gentle while suppressing a change in the developed torque.

The controlling of ignition timing, which is conducted by the engine control unit 21 (the microprocessor) during cranking of an internal combustion according to the third embodiment of the present invention will be described hereinbelow with reference to the flow chart shown in FIG. 5 and the system of FIG. 1.

The third embodiment is characterized in that when the cranking operation having performed by the operator is judged as not an initial cranking operation but a re-cranking operation, a controlling is conducted so as to give a retard angle correction to the ignition timing from the beginning of the re-cranking operation.

Figure 5:
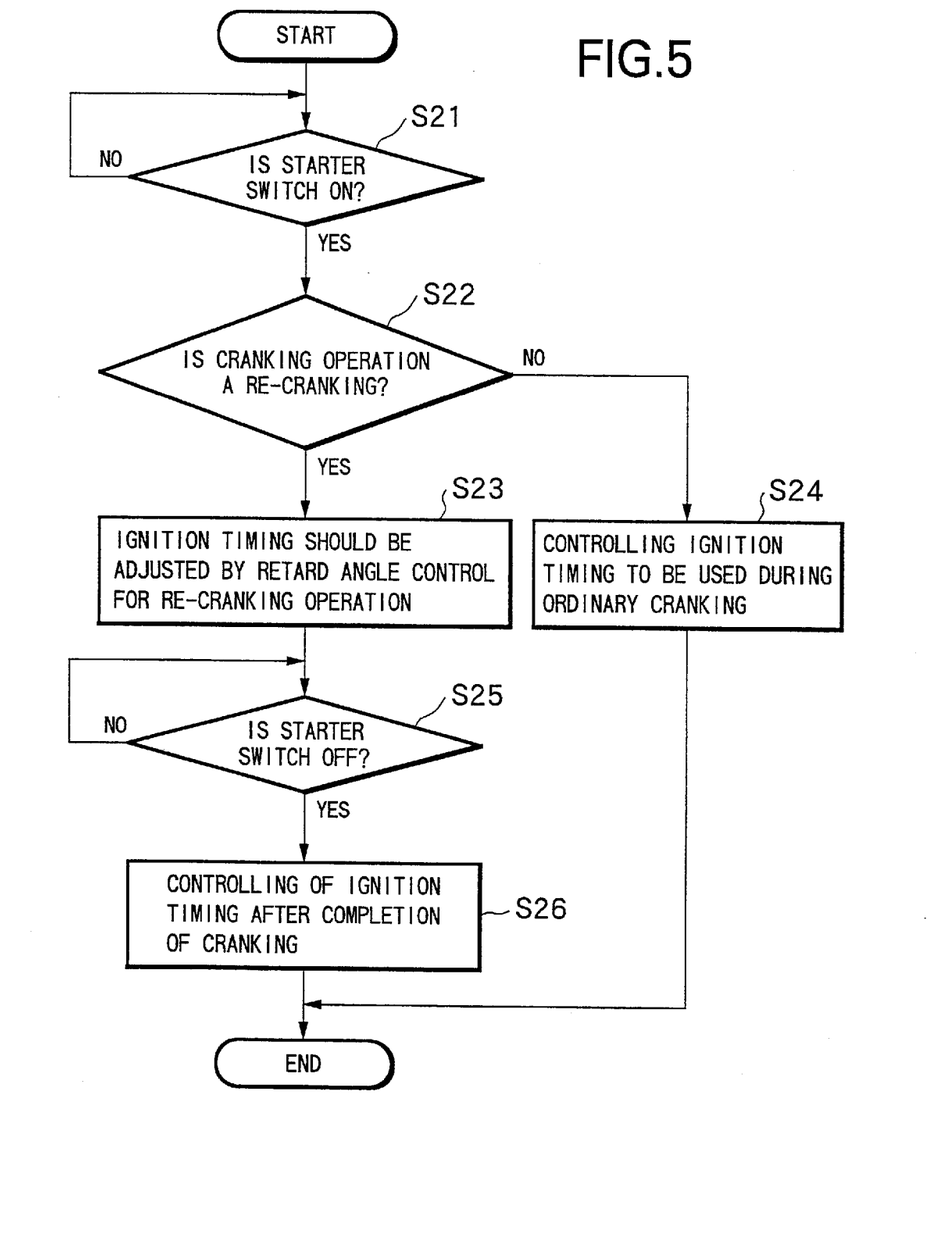
FIG. 5 is a flow chart illustrating the routine of controlling conducted by a control apparatus for controlling ignition timing of an internal combustion engine according to the third embodiment of the present invention.

In the controlling steps S21 through S26 of the flow chart of FIG. 5, a judgment as to whether or not the starter switch 20 is turned on is conducted in Step 21. Thereafter, in Step 22, the cranking operation having performed by an engine operator is judged as to whether or not it is a re-cranking operation. This judgment is accomplished through either a judgment as to whether or not the temperature of engine cooling water during cranking of the engine 2 is equal to or larger than a predetermined temperature or a judgment as to whether or not the cranking operation has been performed within a predetermined time interval after the termination of the previous operation of the engine 2.

When the cranking operation having performed is judged as not a re-cranking operation but an ordinary cranking operation (the cranking of a cold internal combustion engine), the controlling routine is forwarded to Step 24. Thus, in Step 24, controlling of ignition timing during ordinary cranking of the engine 2 is controlled in a manner similar to the controlling conducted in the first and second embodiments.

When it is judged that the cranking operation having performed is a re-cranking operation, the controlling routine is forwarded to Step 23 in which controlling is conducted so as to give a retard angle correction to the ordinary ignition timing. The practical timing of ignition performed by the spark plug 9 is adjustably controlled so as to meet with the above-mentioned corrected ignition timing during the re-cranking operation of the engine 2. It should here be understood that when the re-cranking of the engine 2 is conducted, since the temperature in the combustion chamber or chambers is kept at a high temperature, ignition delay or firing delay is smaller than that during the ordinary cranking of the engine. Therefore, the controlling operation according to Step 23 is conducted.

Figure 6:
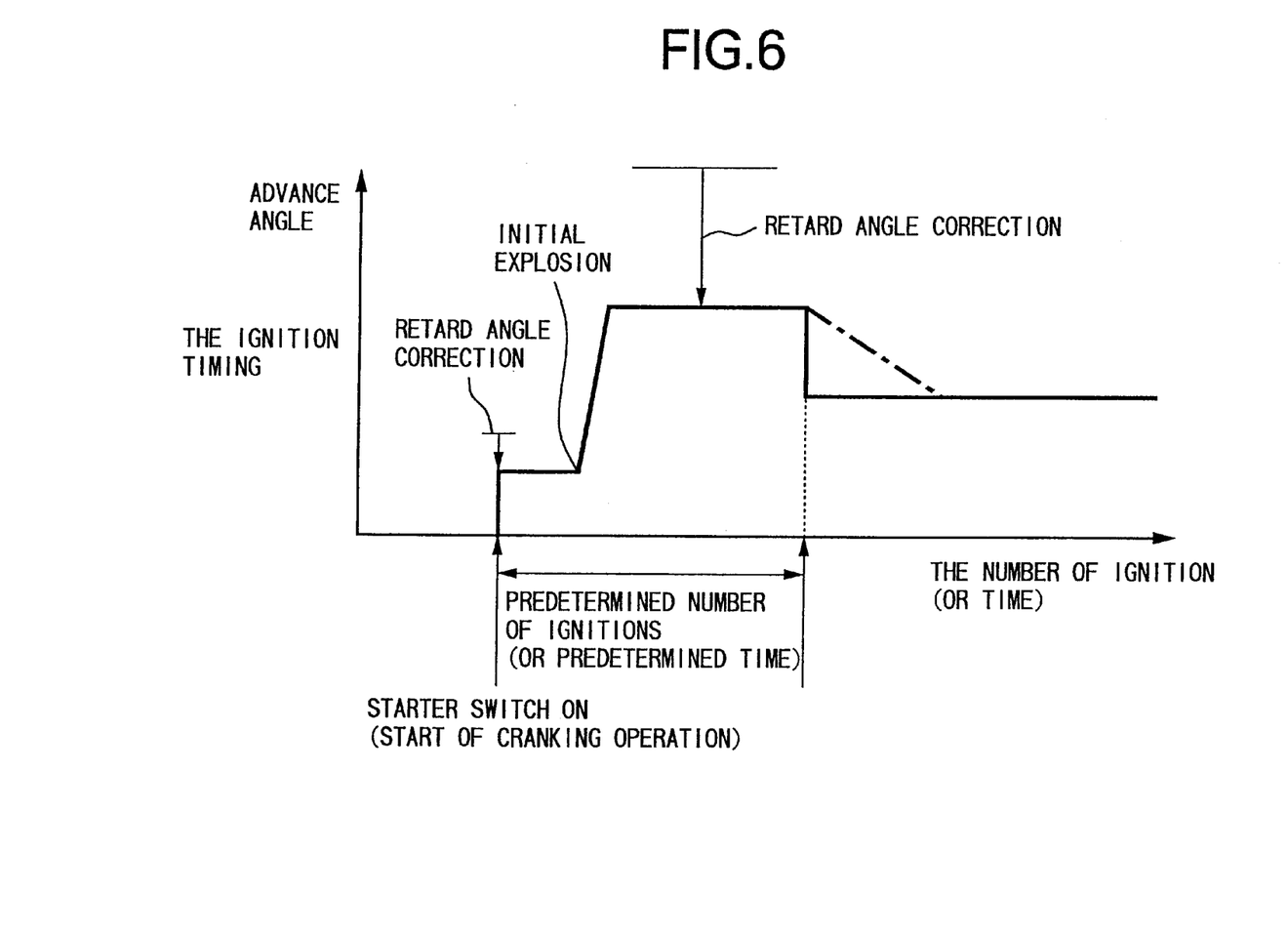
FIG. 6 is a graphical view illustrating the characteristic of ignition timing during re-cranking with reference to the time lapse or the number of ignitions, represented by the control apparatus of the third embodiment of the present invention.

More specifically, as shown in FIG. 6, an initial value of the ignition timing at the time of starting the re-cranking operation by turning on the starter switch 20 and a limited timing value of the ignition timing that is adjustably advanced due to an increase in the engine rotating speed after the initial explosion are corrected so as to shift them toward the retarded angle side. However, with regard to the initial value of the ignition timing at the time of starting the re-cranking operation of the engine, if the ignition timing during the ordinary cranking of an internal combustion engine is set at a fully retarded angle side, it will not be necessary to further correct the ignition timing toward a more retarded angle side. Furthermore, when either the higher is the temperature of the cooling water during the re-cranking or the shorter is the time lapse from the termination of the operation of the engine to the re-cranking, the amount of correction in retarded angle made to the ignition timing may be large.

After the re-cranking operation, either when the number of ignition is larger than the predetermined number or when the time lapse is larger than the predetermined time, a further correction should be made to the ignition timing in the same manner as that made in the ordinary cranking operation, i.e., a correction toward the retard angle side should be further added to the ignition timing in response to a temperature rise in the combustion chamber or chambers. Nevertheless, if it is detected that a temperature in the combustion chamber or chambers during the re-cranking is kept at fully high and if the retard angle correction made to the ignition timing is set sufficiently large in response to an increase in the engine speed, it is not necessary to make any further correction to the ignition timing toward the retard angle side.

In Step 25, a judgment is conducted as to whether or not the starter switch 20 is turned off. If it is judged that the starter switch 20 is turned off (YES), the controlling operation for the ignition timing during cranking is terminated to forward the controlling routine to Step 26 in which controlling of the ignition timing after the cranking operation is conducted.

It should be understood that the described third embodiment of the present invention is effective for preventing occurrence of excessively advance of ignition timing not only during the ordinary cranking operation (the cranking of the cold engine) but also during the re-cranking of the engine (the cranking within the predetermined time after the termination of the engine operation). Thus, a large developed torque can be obtained while enhancing the engine cranking performance.

The description of controlling of the ignition timing during cranking of an internal combustion engine according to the fourth embodiment of the present invention is provided hereinbelow with reference to FIGS. 7 through 9.

Figure 7:
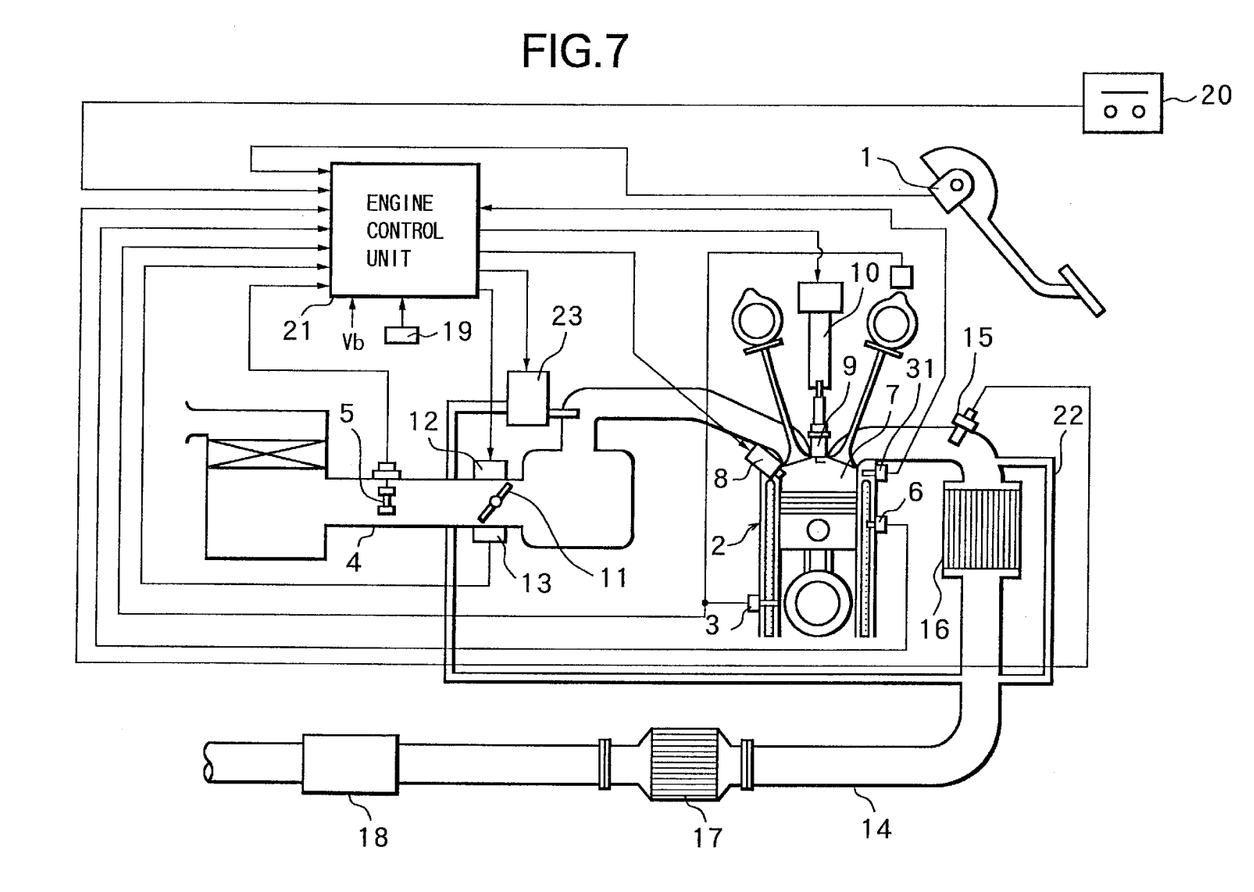
FIG. 7 is a diagrammatic block diagram illustrating an entire system of an internal combustion engine, which includes a control apparatus for controlling an ignition timing of the internal combustion engine, according to a fourth embodiment of the present invention.

The system of an internal combustion engine 2 illustrated in FIG. 7 is different from that shown in FIG. 1 in that a temperature sensor 31 is disposed at a position adjacent to the combustion chamber 7 to detect the temperature prevailing in the engine cylinder. A signal indicating the temperature detected by the temperature sensor 31 is supplied to the engine control unit 21 so that the latter unit 21 (the microprocessor) may conduct the controlling operation of the ignition timing on the basis of the temperature in the combustion chamber 7. The controlling operation is illustrated in the flow chart shown in FIG. 8.

Figure 8:
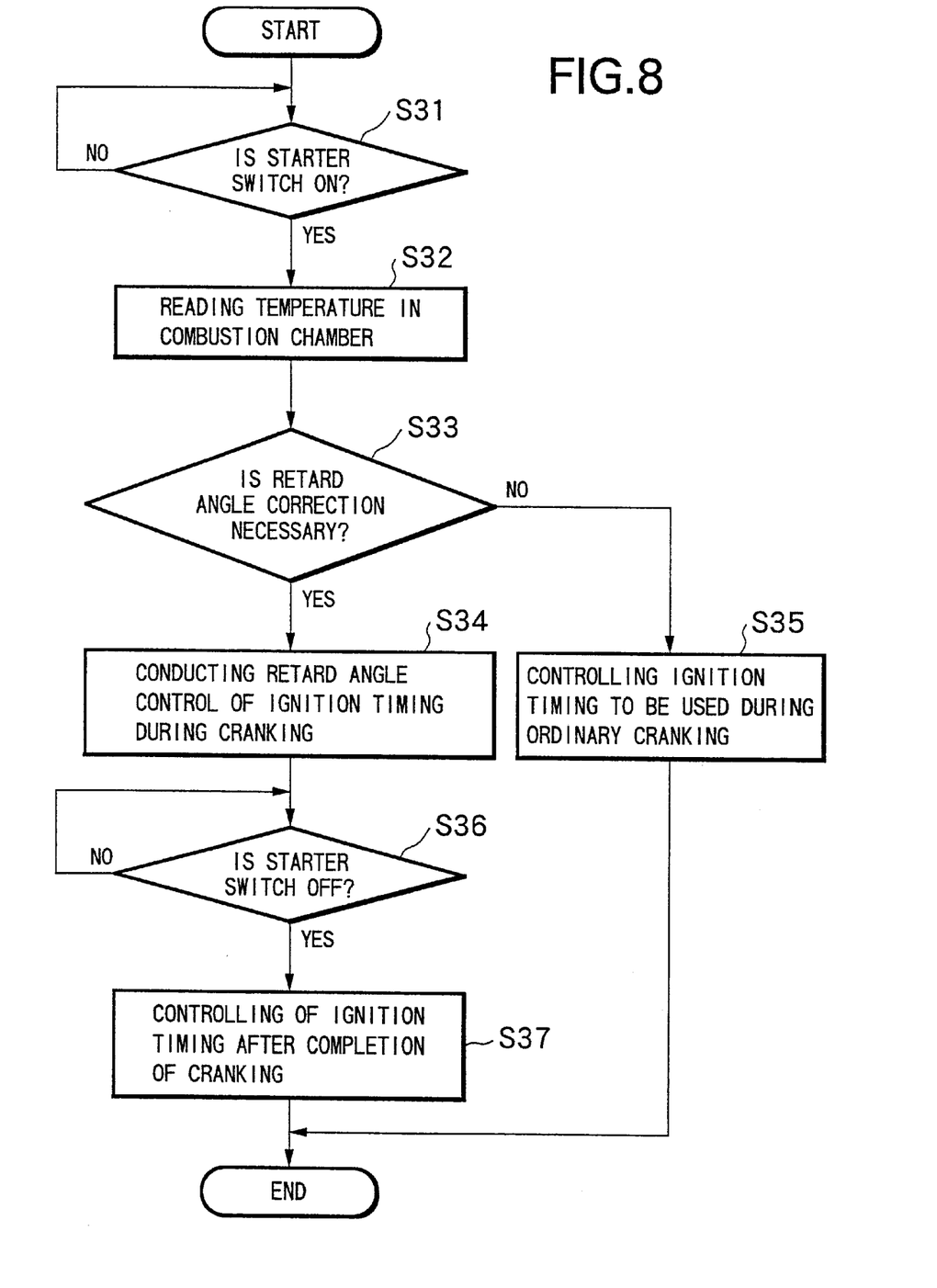
FIG. 8 is a flow chart illustrating the routine of controlling conducted by the control apparatus for controlling ignition timing of an internal combustion engine according to the fourth embodiment of the present invention; and, FIGS. 9A and 9B are graphical views the characteristic curves of required ignition timing during cranking.

Referring to FIG. 8, a judgment of the starter switch 20 as to whether it is turned on or not is conducted by the control unit 21 (the microprocessor) in Step 31. In Step 32, the control unit 21 conducts reading of the temperature of the combustion chamber 7 detected by the temperature sensor 31.

In Step 33, a judgment as to whether or not a retard angle correction to the ignition timing should be made because of a high temperature prevailing in the combustion chamber 7 from the initiation of cranking of the engine 2 (the re-cranking of the engine), on the basis of the detected temperature data supplied by the temperature sensor 31. Then, if it is judged that the retard angle correction to the ignition timing from the initiation of the cranking operation is not necessary for the reason that the cranking operation having performed by an operator is an ordinary cranking operation, the controlling routine is forwarded to Step 35 in which the controlling of the ignition timing during ordinary cranking is conducted in the same manner as those conducted in the afore-described first and second embodiment.

In Step 33, if it is judged that a retard angle correction to the ignition timing is necessary, the controlling routine is forwarded to Step 34 to conduct a controlling operation similar to the controlling operation of Step 24 in the afore-described third embodiment of the present invention. Namely, in Step 34, a retard angle correction larger than that made during ordinary cranking is given to the ignition timing, so that the practical ignition timing is controlled so as to meet with the ignition timing corrected with a larger retard angle. In this case, the amount of retard angle correction given to the ignition timing may be set larger if the higher is the temperature in the combustion chamber 7 detected by the temperature sensor 31.

In Step 36, a judgment is conducted by the microprocessor as to whether or not the starter switch 20 is turned off, and if it is judged that the switch 20 is turned off, the controlling of the ignition timing during cranking of the engine 2 is terminated. Then, the controlling routine is forwarded to Step 37 to conduct controlling of the ignition timing after the cranking operation of the engine 2.

Thus, during both the ordinary cranking and the cranking needing the retard angle correction to the ignition timing, controlling of the ignition timing from the initiation to the termination of the cranking operation can be conducted so as to accurately meet with the requested ignition timing, on the basis of the temperature in the combustion chamber 7 actually detected by the temperature sensor 31. Therefore, the most optimum cranking performance of the internal combustion engine can be achieved.

This application claims priority of Japanese Patent Application No. 2000-265868 filed on Sep. 1, 2000. The entire disclosure of Japanese Patent Application No.2000-265868 is hereby incorporated herein by reference.

While the foregoing description is directed to only selected embodiments to illustrate the present invention, it will be apparent to those skilled in the art from the disclosure that various changes and modifications may be made herein without departing from the scope and spirits of the invention as claimed in the accompanying claims.

Additionally, it should be understood that the foregoing description of the embodiments according to the present invention are provided for illustration only, and not for the purpose of limiting the invention as defined by the accompanying claims and their equivalents.

What is claimed is:

1. An apparatus for controlling an ignition timing of an internal combustion engine comprising:
   a starter for cranking the engine;
   a microprocessor programmed to:
      detect a cranking operation of said engine, and
      set an ignition timing employed in the cranking operation in accordance with the number of ignitions from an initiation of the cranking operation, the number of ignitions being representative of temperature in a combustion chamber of said engine; and
   a spark plug that ignites an air-fuel mixture in the combustion chamber on the basis of the ignition timing when said engine is in the cranking operation.

2. The apparatus according to claim 1, wherein said ignition timing employed in the cranking operation is retarded as said number of ignitions increases.

3. The apparatus according to claim 1, wherein said ignition timing employed in the cranking operation is set at a predetermined timing when the number of ignitions is smaller than a predetermined value, and is retarded from said predetermined timing when the number of ignitions becomes greater than or equal to said predetermined value.

4. The apparatus according to claim 3, wherein said ignition timing employed in the cranking operation is gradually retarded from said predetermined timing as the number of ignitions increases when said number of ignitions becomes greater than or equal to said predetermined value.

5. The apparatus according to claim 3, wherein said ignition timing employed in the cranking operation is retarded from said predetermined timing in a stepwise basis when said number of ignitions becomes greater than or equal to said predetermined value.

6. The apparatus according to claim 3, wherein said predetermined timing is set constant.

7. The apparatus according to claim 3, wherein said ignition timing employed in the cranking operation is set at a second predetermined timing until an initial explosion occurs after the initiation of said cranking operation, and wherein said second predetermined timing is set at a retardant side relative to the afore-said predetermined timing.

8. The apparatus according to claim 7, wherein said second predetermined timing is set at a retardant side relative to the ignition timing employed in the cranking operation when said number of ignitions is greater than or equal to said predetermined value.

9. The apparatus according to claim 7, wherein said second predetermined timing is set constant.

10. The apparatus according to claim 3, wherein said predetermined timing is corrected toward a retardant side when said engine is re-started shortly after said engine is stopped.

11. The apparatus according to claim 3, wherein said microprocessor is further programmed to set an ordinary ignition timing, and wherein said spark plug ignites the air-fuel mixture in said combustion chamber on the basis of said ordinary ignition timing when the cranking operation of said engine has been completed.

12. An apparatus for controlling an ignition timing of an internal combustion engine comprising:
   a starter for cranking the engine;
   a microprocessor programmed to:
      detect a cranking operation of said engine, and
      set an ignition timing employed in the cranking operation in accordance with a time that has elapsed since an initiation of the cranking operation, the time being representative of temperature in a combustion chamber of said engine; and
   a spark plug that ignites an air-fuel mixture in the combustion chamber on the basis of the ignition timing when said engine is in the cranking operation.

13. The apparatus according to claim 12, wherein said ignition timing employed in the cranking operation is set at a predetermined timing when the elapsed time is smaller than a predetermined value, and the ignition timing is retarded from said predetermined timing when said elapsed time becomes greater than or equal to said predetermined value.

14. The apparatus according to claim 13, wherein said ignition timing employed in the cranking operation is gradually retarded from said predetermined timing as said elapsed time increases when said elapsed time becomes greater than or equal to said predetermined value.

15. The apparatus according to claim 13, wherein said ignition timing employed in the cranking operation is retarded from said predetermined timing in a stepwise basis when said elapsed time becomes greater than or equal to said predetermined value.

16. The apparatus according to claim 13, wherein said predetermined timing is set constant.

17. The apparatus according to claim 13, wherein said ignition timing employed in the cranking operation is set at a second predetermined timing which is set at a retardant side relative to said predetermined timing until an initial explosion occurs after the initiation of the cranking operation.

18. The apparatus according to claim 17, wherein said second predetermined timing is set at a retardant side relative to said ignition timing employed in the cranking operation when said elapsed time is greater than or equal to said predetermined value.

19. The apparatus according to claim 18, wherein said second predetermined timing is set constant.

20. The apparatus according to claim 13, wherein said predetermined timing is corrected toward a retardant side when said engine is re-started shortly after said engine is stopped.

21. The apparatus according to claim 13, wherein said microprocessor is further programmed to set an ordinary ignition timing, and wherein said spark plug ignites the air-fuel mixture in said combustion chamber on the basis of said ordinary ignition timing when the cranking operation of said engine has been completed.

22. A method of controlling an ignition timing of an internal combustion engine comprising:
   detecting a cranking operation of said engine;
   setting an ignition timing employed in the cranking operation in accordance with the number of ignitions since an initiation of the cranking operation, the number of ignitions being representative of temperature in a combustion chamber of said engine; and
   igniting an air-fuel mixture in the combustion chamber on the basis of said ignition timing when said engine is in the cranking operation.

23. The method according to claim 22, wherein said ignition timing employed in the cranking operation is retarded as said number of ignitions increases.

24. The method according to claim 22, wherein said ignition timing employed in the cranking operation is set at a predetermined timing when the number of ignitions is smaller than a predetermined value, and is retarded from said predetermined timing when the number of ignitions becomes greater than or equal to said predetermined value.

25. The method according to claim 24, wherein said ignition timing employed in the cranking operation is set at a second predetermined timing which is set at a retardant side relative to said predetermined timing until an initial explosion occurs after the initiation of the cranking operation.

26. The method according to claim 25, wherein said second predetermined timing is set at a retarded side relative to said ignition timing employed in the cranking operation when the number of ignitions is greater than or equal to said predetermined value.

27. The method according to claim 24, wherein said predetermined timing is corrected toward a retardant side when said engine is re-started shortly after said engine is stopped.

28. The method according to claim 26, wherein when said setting of said ignition timing in the cranking operation is programmed in a microprocessor, an ordinary ignition timing is further programmed in said microprocessor, and wherein said ignition of the air-fuel mixture carried out by a spark plug is performed on the basis of said ordinary ignition timing when the cranking operation of said engine has been completed.

29. A method of controlling an ignition timing of an internal combustion engine comprising:

detecting a cranking operation of said engine;

setting an ignition timing employed in the cranking operation in accordance with a time that has elapsed since an initiation of the cranking operation, the time being representative of temperature in a combustion chamber of said engine; and igniting an air-fuel mixture in the combustion chamber on the basis of said ignition timing when said engine is in the cranking operation.

30. The method according to claim 29, wherein said ignition timing employed in the cranking operation is set at a predetermined timing when said elapsed time is smaller than a predetermined value, and said ignition timing is retarded from said predetermined timing after said elapsed time becomes greater than or equal to said predetermined value.

31. The method according to claim 30, wherein said ignition timing employed in the cranking operation is set at a second predetermined timing which is set at a retardant side relative to the afore-mentioned predetermined timing until an initial explosion occurs after the initiation of the cranking operation.

32. The method according to claim 31, wherein said second predetermined timing is set at a retardant side relative to said ignition timing employed in the cranking operation when said elapsed time is greater than or equal to said predetermined value.

33. The method according to claim 29, wherein said predetermined timing is corrected toward a retardant side when said engine is re-started shortly after said engine is stopped.

34. The method according to claim 29, wherein when said setting of said ignition timing in the cranking operation is programmed in a microprocessor, an ordinary ignition timing is further programmed in said microprocessor, and wherein said ignition of the air-fuel mixture carried out by a spark plug is performed on the basis of said ordinary ignition timing when the cranking operation of said engine has been completed.

* * * * *